United States Patent [19]

Hayashi

[11] Patent Number: 4,605,163

[45] Date of Patent: Aug. 12, 1986

[54] PASSENGER ROOM HEATING SYSTEM FOR USE WITH BOILING LIQUID ENGINE COOLING SYSTEM

[75] Inventor: Yoshimasa Hayashi, Kamakura, Japan

[73] Assignee: Nissan Motor Co., Ltd., Yokohama, Japan

[21] Appl. No.: 764,113

[22] Filed: Aug. 9, 1985

[30] Foreign Application Priority Data

Sep. 29, 1984 [JP] Japan .................. 59-202943

[51] Int. Cl.$^4$ .............................................. B60H 1/02
[52] U.S. Cl. .................................. 237/2 A; 237/6; 237/12.3 B; 123/41.08; 123/41.21
[58] Field of Search ............... 123/41.2, 41.21, 41.24, 123/41.25, 41.26, 41.27; 237/12.3 B, 12.3 A, 12.3 R, 6, 2 A, 40

[56] References Cited

U.S. PATENT DOCUMENTS 2,413,770  1/1947  Knoy ........................ 123/41.21

Primary Examiner—Henry Bennett
Attorney, Agent, or Firm—Schwartz, Jeffery, Schwaab, Mack, Blumenthal & Evans

[57] ABSTRACT

Herein disclosed is an improved passenger room heating system for use with a boiling liquid type engine cooling system. A coolant inlet tube of the heater core of the passenger room heater is connected to the coolant jacket of the engine through parallelly arranged two coolant outlet ports which are formed in the engine proper. One of the outlet ports is positioned above the other when the engine is properly mounted in a vehicle. A thermally operable valve is associated with the junction portion of the two outlet ports so that when the temperature of the coolant is higher than a predetermined degree, the upper outlet port is closed and the lower outlet port is opened, while, when the temperature of the coolant is lower than the predetermined degree, the upper outlet port is opened and the lower outlet port is closed.

9 Claims, 3 Drawing Figures

PASSENGER ROOM HEATING SYSTEM FOR USE WITH BOILING LIQUID ENGINE COOLING SYSTEM

BACKGROUND OF THE INVENTION

1. Field of the Invention

The present invention relates in general to a car heater for warming the passenger compartment of a motor vehicle, and more particularly to a passenger room heating system which is incorporated with a so-called "boiling liquid engine cooling system".

2. Description of the Prior Art

A so-called "boiling liquid engine cooling system (viz., evaporative cooling system)" has been proposed for achieving cooling of an internal combustion engine. This type cooling system basically features an arrangement in which a liquid coolant (for example, water or a mixture of water and antifreeze or the like) in the coolant jacket of the engine is permitted to boil and the gaseous coolant thus produced is passed out to an air-cooled heat exchanger or condenser where the gaseous coolant is cooled and liquefied and then recirculated back into the coolant Jacket of the engine. Due to the excellent heat exchange effected between the gaseous coolant in the condenser and the atmosphere surrounding the condenser, the cooling system exhibits a very high performance. One of the cooling systems of such type is disclosed in Japanese Patent Application First Provisional Publication No. 57-62912.

Apart from the above, various kinds of car heaters have been hitherto proposed and put into practical use. However, most of the car heaters are of a type which is designed for use with a conventional "water-cooled type engine cooling system" which uses water in liquid state for cooling the engine.

SUMMARY OF THE INVENTION

It is therefore an object of the present invention to provide an improved passenger room heating system which is designed for use with a boiling liquid engine cooling system.

In the improved passenger room heating system of the invention, a coolant inlet tube of the heater core of the passenger room heater is connected to the coolant jacket of the engine through parallelly arranged two coolant outlet ports formed in the engine. One of the outlet ports is positioned above the other. A thermally operable valve is associated with the junction portion of the coolant inlet tube and the two outlet ports so that when the temperature of the coolant is higher than a predetermined degree, the upper outlet port is closed and the lower outlet port is opened, while, when the temperature of the coolant is lower than the predetermined degree, the upper outlet port is opened and the lower outlet port is closed.

According to the present invention, there is provided an improved passenger room heating system for a motor vehicle powered by a combustion engine cooled by a boiling liquid cooling system which includes a coolant jacket defined in the engine proper and containing therein a liquid coolant to a certain level to cover highly heated portions of the engine, a condenser for condensing the gaseous coolant introduced thereinto from the coolant jacket and recirculating means for recirculating the coolant thus liquefied by the condenser back into the coolant jacket. The passenger room heating system comprises a heat exchanger through which a liquid flows for achieving heat exchange between the liquid and air in the passenger room; vertically spaced first and second outlet ports formed in the engine proper to connect the coolant jacket separately, the second outlet port being positioned above the first outlet port when the engine is properly mounted in the vehicle; a first conduit extending from a junction portion of the first and second outlet ports to a coolant inlet of the heat exchanger; a second conduit extending from a coolant outlet of the heat exchanger to the coolant jacket; pumping means for enforcedly recirculating the coolant through the first conduit, the heat exchanger, the second conduit and the coolant jacket in this order; and switch means associated with the first and second outlet ports, the switch means functioning to open the second outlet port and close the first outlet port when the temperature of the coolant is lower than a predetermined degree and to close the second inelt port and open the first outlet port when the temperature of the coolant is higher than the predetermined degree.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
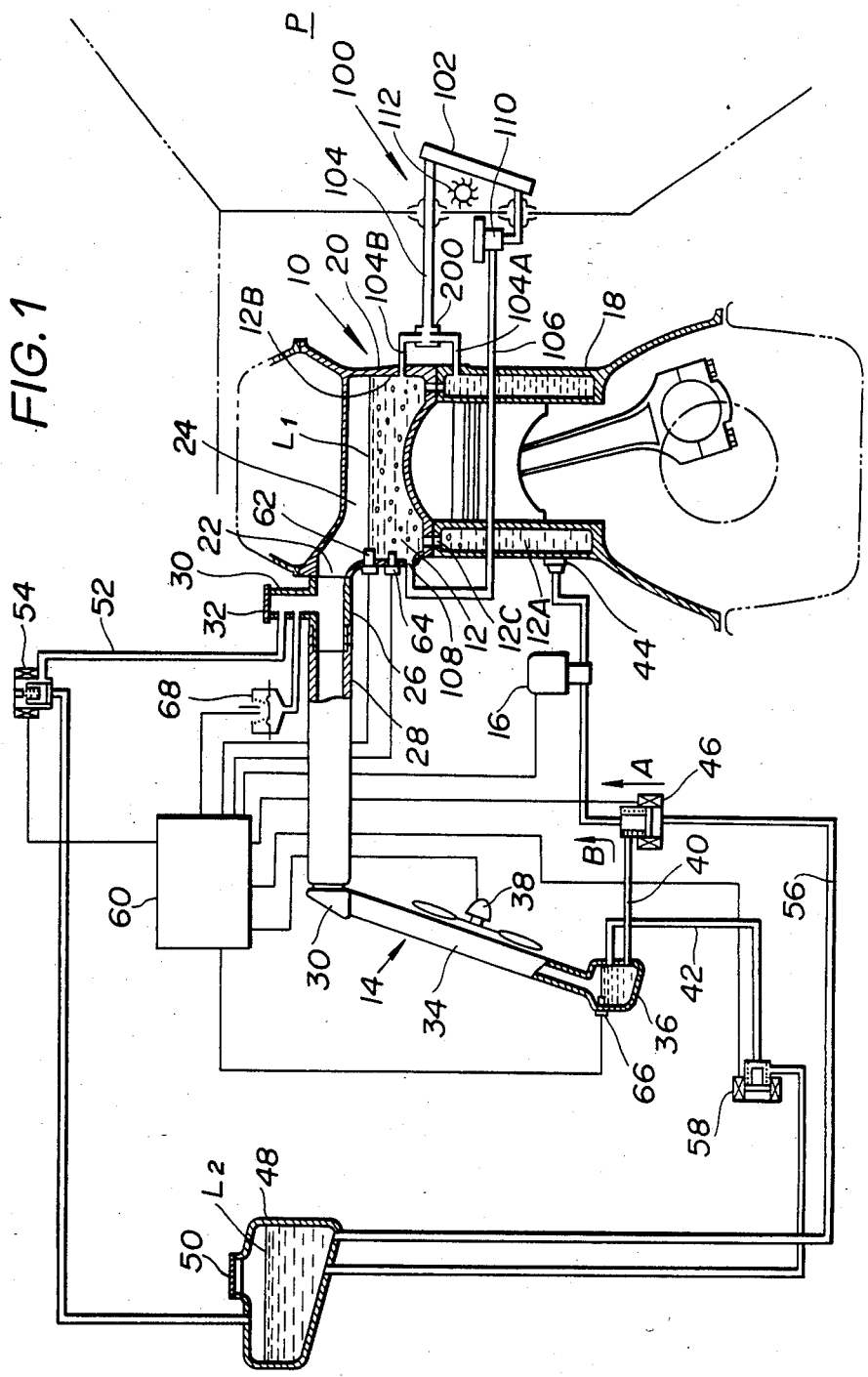
FIG. 1 is a schematical illustration of a passenger room heating system incorporated with a boiling liquid cooling system, according to the present invention.

Referring to FIG. 1 of the drawings, there is shown an embodiment of the present invention, which is a passenger room heating system for use with a so-called boiling liquid type engine cooling system. Prior to describing the heating system of the present invention, the boiling liquid cooling system to which the present invention is applied will be described with reference to FIG. 1.

In the drawing, denoted by numeral 10 is an engine proper which includes therein a coolant jacket 12, 14 is a condenser or air-cooled radiator which condenses gaseous coolant into liquid coolant, and 16 is an electric pump which, upon energization, pumps the liquid coolant from the condenser into the coolant jacket 12. The coolant is water or a mixture of water and anti-freeze.

The coolant jacket 12 comprises cavities 12A and 12B which are formed respectively in a cylinder block 18 and a cylinder head 20 in a manner to surround the cylinders and combustion chambers respectively. The cavites 12A and 12B are connected to each other through a plurality of passages 12C which are formed in their mating portions, as shown. A vapor outlet port 22 is formed in the cylinder head 20 at the position of a vapor chamber 24 which appears in the upper portion of the coolant jacket 12 when the cooling system operates normally. The vapor outlet port 22 is connected through a connector 26 and a vapor passage 28 to an upper tank 30 of the condenser 14. The connector 26 is formed with a riser portion 30 which, as will become clear hereinafter, is placed at the uppermost position of a closed coolant circulation circuit. A cap 32 is detachably fitted to an open upper end of the riser portion 30.

The condenser 14 comprises generally the upper tank 30 to which the vapor passage 28 is connected, a core portion 34 including fine tubes, and a lower tank 36 into which the coolant liquefied by the core portion 34 pours. The condenser 14, when mounted to a vehicle, is placed at a position, such as front portion of the vehicle, where natural air draft is produced. An electric fan 38 is located adjacent the condenser 14 in order to produce cooling air flow which passes through the condenser 14. A liquid coolant passage 40 is connected to a relatively lower portion of the lower tank 36, and a second auxiliary coolant passage 42 is connected to a relatively upper portion of the same. The liquid coolant passage 40 extends to a coolant inlet port 44 of the coolant jacket 12. The electric pump 16 is disposed in the liquid coolant passage 40 near the inlet port 44 of the coolant jacket 12. A second electromagnetic valve 46 is also disposed in the passage 40 at a position between the lower tank 36 and the electric pump 16. In the disclosed embodiment, the coolant inlet port 44 is formed in the cylinder block 18. However, if desired, the port may be formed in the cylinder head 20.

With this arrangement, the coolant jacket 12, the vapor passage 28, the condenser 14, the lower tank 36, the liquid coolant passage 40, the second electromagnetic valve 46 and the electric pump 16 constitute a coolant circulation system which is hermetically closed when the associated engine 10 is running. That is, under operation of the engine 10, the liquid coolant in the coolant jacket 12 boils and the gaseous coolant (vapor) thus produced is passed out to the condenser 14 where the vapor is cooled and thus liquefied and then recirculated back, by the work of the electric pump 16, into the coolant jacket 12 for another circulation of the coolant.

A reservoir tank 48 is arranged outside of the closed coolant circulation system. The reservoir tank 48 contains therein additional coolant which is used for achieving air purge for the closed circuit as will become apparent hereinafter. An air permeable cap 50 is detachably fitted to the reservoir tank 48, so that the interior of the tank 48 is communicated with the surrounding air. Upon mounting on a vehicle, the reservoir tank 48 is placed at a higher portion so that the coolant level ($L_2$) in the tank 48 is considerably higher than the highest portion (viz., the riser portion 30) of the coolant circulation circuit. An air discharging passage 52 is connected to the riser portion 30, which extends therefrom to an upper portion of the reservoir tank 48. As will be described hereinafter, under air purging operation, liquid coolant also flows in the passage 52 into the reservoir tank 48. A first electromagnetic valve 54 is disposed in the air discharging passage 52.

To the bottom of the reservoir tank 48, there are connected the other end of the second auxiliary coolant passage 42 and a first auxiliary coolant passage 56. The first passage 56 is connected to the above-mentioned liquid coolant passage 40 through the second electromagnetic valve 46 which is of a three way type. The valve 46 assumes two conditions, one being a condition (flow A) wherein the first auxiliary coolant passage 56 is connected to the passage 40 for the inlet port 44 of the coolant jacket 12A while blocking the passage 40 for the lower tank 36 of the condenser 14, and the other being a condition (flow B) wherein the passage 40 for the lower tank 36 is connected to the passage 40 for the inlet port 44 for the coolant jacket 12A while blocking the passage 56. A third electromagnetic valve 58 is disposed in the second auxiliary coolant passage 42.

The electromagnetic valves 54, 46 and 58, the electric pump 16, and the electric fan 38 are controlled by a control unit 60 which includes a microcomputer. For this control, information signals issued from a first coolant level sensor 62 and a temperature sensor 64 which are disposed in the coolant jacket 12B of the cylinder head 20, a second coolant level sensor 66 disposed in the lower tank 36 of the condenser 14, and a vacuum switch 68 connected to the riser portion 30 of the closed circuit are applied to the control unit 60.

The first and second coolant level sensors 62 and 66 are of a float type sensor which uses a reed switch. In such sensors, detection as to whether the coolant level comes to a predetermined level or not is achieved in ON-OFF manner. The first coolant level sensor 62 is arranged to detect the predetermined level at a vertically middle portion of the coolant jacket 12B of the cylinder head 20, and the second coolant level sensor 66 is arranged to detect the predetermined level at a position slightly higher than the port (no numeral) to which the second auxiliary coolant passage 42 is connected, as shown. The temperature sensor 64 is of a thermistor type and positioned somewhat below the first coolant level sensor 62 so that the sensor 64 is usually immersed in the liquid coolant in the coolant jacket 12. The vacuum switch 68 is of a type using a diaphragm which is movable in accordance with the pressure difference between the interior of the system and the atmosphere so that the vacuum switch 68 detects whether the interior of the system is negative, or not in pressure relative to the atmospheric pressure regardless of the altitude of the position where the switch 68 is placed. In the dislcosed embodiment, the switch 68 is designed to detect the negative pressure of the degree ranging from $-30$mmHg to $-50$mmHg.

The boiling liquid cooling system as described hereinabove operates as follows:

Under standstill of the engine 10, the boiling liquid cooling system is filled with air-contaminated liquid coolant due to inherent air leakage in the system during operation of the same. As is known, air contamination of the system severely deteriorates the performance of the same.

Accordingly, upon start-up of the engine 10, air purge operation is carried out. The air purge operation is effected by pumping excess coolant from the reservoir tank 48 into the systemn for a predetermined period of time. As the system should be essentially full with the coolant, the excess coolant thus introduced positively displaces any air or the like that have collected. That is, the purge operation is carried out by opening the first valve 54, making the second valve 46 assume the condition of "flow A" and closing the third valve 58 and energizing the electric pump 16 for several tens of seconds. Thus, the pump 16 inducts the liquid coolant from the reservoir tank 48 via the first auxiliary coolant passage 56 and forces the same into the coolant jacket 12. The excess coolant thus introduced accordingly escapes from the riser portion 30 of the system via the air discharging passage 52 into the reservoir tank 48. Any air or the like non-condensible matter is carried out of the system along with the overflowing coolant.

Upon termination of this mode of operation, the system enters a so-called "excess coolant displacement mode" wherein the coolant is permitted to heat, produce vapor pressure and displace itself out of the system back to the reservoir 48 via the second auxiliary liquid coolant 42. In order to achieve this, the first valve 54 is closed, the second valve 46 is turned to assume the condition of "flow B" and the third valve 58 is opened placing the coolant jacket 12 in fluid communication with the reservoir tank 48 through the passages 40 and 42. As the coolant is displaced out of the system by the force of the vapor pressure produced in the coolant jacket 12, the level of liquid coolant in the jacket 12 falls below that of the coolant level sensor 62. Accordingly, the electric pump 16 is energized and thus coolant is pumped from the lower tank 36 of the condenser 14 into the coolant jacket 12 so as to maintain the level of coolant therein at that of level sensor 62. During this, the electric fan 38 is on-off controlled by the information signal issued from the temperature sensor 64 in the coolant jacket 12 so as to keep the temperature of the coolant at the predetermined degree. The coolant pumping operation stops when the level of liquid coolant in the lower tank 36 falls to that of the second coolant level sensor 66. Upon termination of this operation, that is, upon termination of the displacement mode, the third valve 58 is closed to place the cooling system in a "closed" state.

Thereafter, normal operation starts with the first valve 54 closed, the second valve 46 assuming the condition of "flow B" and the third valve 58 closed. During this, the elecrtric fan 38 is controlled in ON-OFF manner so as to keep the temperature of the coolant at the predetermined degree, and the electric pump 16 is also controlled in ON-OFF manner so as to keeps the levels of coolant in the coolant jacket 12 and the lower tank 36 at the predetermined levels. During this normal operation, the vapor produced in the coolant jacket 12 is condensed in the condenser 14. The rate at which the vapor is condesed is controlled in accordance with the engine load and engine rotation speed.

When, after stop of the engine 10, the vacuum switch 68 senses a considerable negative pressure in the system, the second valve 46 is opened thereby to force the additional liquid coolant to flow from the reservoir tank 48 to the coolant jacket 12. With this, the negatrive pressure in the system disappears.

A passenger room heating system 100 incorporated with the above-mentioned engine cooling system comprises a heater core 102 arranged in a passenger compartment P. Coolant inlet and outlet passages 104 and 106 are connected to inlet and outlet ports (no numerals) of the heater core 102. The leading end of the coolant inlet passage 104 is forked into two passages 104A and 104B which are respectively connected to the coolant jacket 12A of the cylinder block 18 and the jacket 12B of the cylinder head 20. As is seen from the drawing, the upper passage 104B is open to the jacket 12B at the position sufficiently below the coolant level ($L_1$) which is constantly kept when the engine 10 is running normally.

Figure 3:
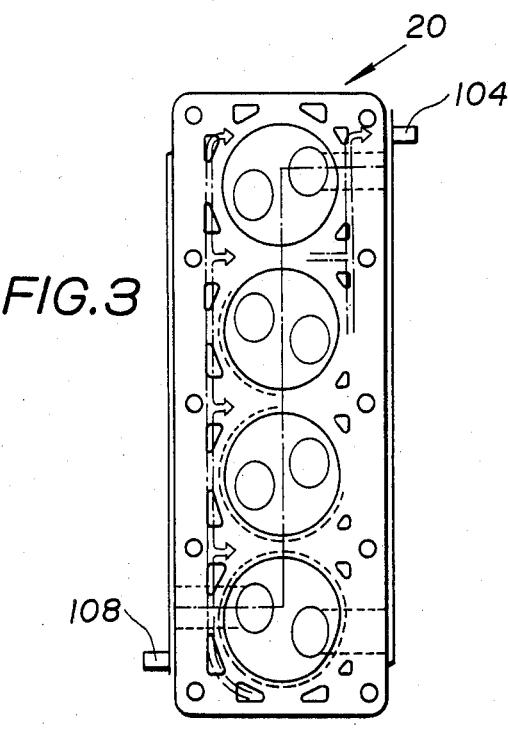
FIG. 3 is a bottom view of a cylinder head of an internal combustion engine to which the present invention is practically applicable.

As will be well described hereinafter, a switch valve 200 is arranged in the forked portion of the coolant inlet passage 104 to switch the coolant flow in the same. The coolant outlet passage 106 extends to the coolant jacket 12B of the cylinder head 20 at a position 108 near the bottom thereof. Preferably, the outlet and inlet ports formed in the cylinder head 20 for the inlet and outlet passages 104 and 106 are positioned distant from each other as much as possible. FIG. 3 shows a preferred arrangement of such ports in which they are arranged in the diagonally opposed portions of the cylinder head 20. The arrows shown in FIG. 3 indicate the direction in which liquid coolant flows in the coolant jacket 12. Such arrangment brings about, in the coolant jacket 12, effective mixing of a low temperature coolant from the heater core 102 with the coolant remaining in the jacket 12. An electric pump 110 is disposed in the coolant outlet passage 106 for producing coolant flow in the heating system from the inlet passage 104 to the outlet passage 106 through the heater core 102. Designated by numeral 112 is an electric fan which produces air flow which passes through the heater core 102 toward the passenger compartment P.

The switch valve 200 is of a thermostatically operable valve which is so constructed that when the temperature of the coolant therein is relatively low, the passage 104B is opened and the other passage 104A is closed, while, when the temperature of the same is relatively high, the passage 104B is closed and the other passage 104A is opened.

Figure 2:
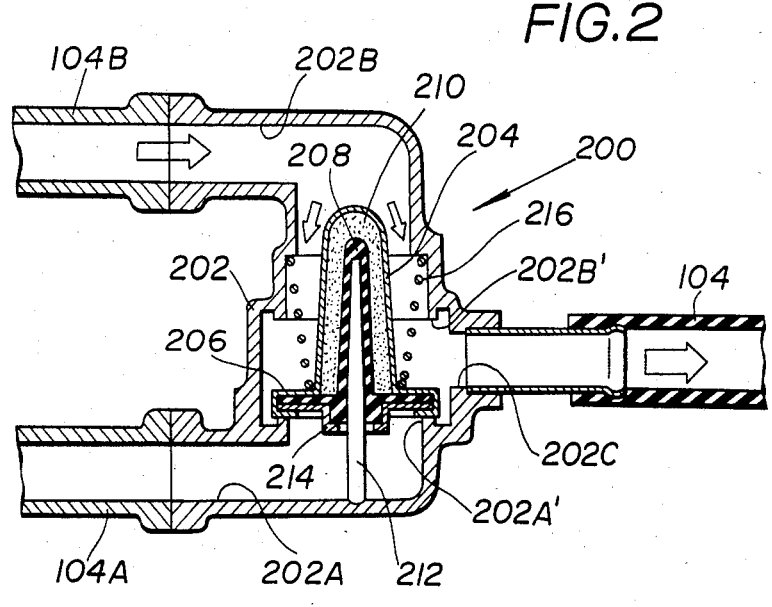
FIG. 2 is a sectional view of a switch valve employed in the passgenger room heating system of the present invention.

The construction of the switch valve 200 is shown in detail in FIG. 2, which shows the condition wherein the passage 104B is opened and the other passage 104A is closed. The switch valve 200 comprises a housing 202 which includes mutually connected three bores 202A, 202B and 202C which are respectively connected to the lower passage 104A, the upper passage 104B and the major portion of the coolant inlet passage 104, as shown. The bores 202A and 202B are respectively provided with valve seat portions 202A' and 202B' which face to each other.

Within the housing 202, there is movably disposed a valve body which comprises a generally conical casing 204 which is provided at its base portion with an enlarged circular flange 206. A conical elastic sleeve 208 is coaxially disposed in the casing 204 with an interposal of wax 210 therebetween. Within the elastic sleeve 208, there is axially slidably disposed a piston rod 212 one end of which is fixed to the inside wall of the bore 202A. As shown, the other end portion of the piston rod 212 is tapered so as to match with the interior shape of the elastic sleeve 208. A circular lid 214 is fixed to the circular flange 206 of the casing 204 to tightly seal the cavity of the wax 210. A coil spring 216 is compressed between the valve body and a stepped portion (no numeral) of the bore 202B so as to bias the valve body and thus the flange 206 of the same to contact with the valve seat portion 202A' to shut the bore 202A. When the valve body is heated to a certain degree by the coolant flowing from the upper passage 104B, the wax 210 in the body expands thereby pressing elastic sleeve 208 against the piston rod 212. Thus, the valve body proper moves gradually upwardly, and finally comes to the position where the circular flange 206 thereof is in contact with the other valve seat portion 202B' to close the bore 202B.

In the following, operation of the passenger room heating system will be described with reference to FIG. 1.

When a heater switch (not shown) is turned ON, the electric pump 110 is energized thereby to introduce the heated liquid coolant from the coolant jacket 12 into the heater core 102 through the coolant inlet passage 104. The coolant in the heater core 102 effects heat exchange with air in the passenger compartment P and the coolant thus somewhat cooled is returned to the coolant jacket 12 of the engine 10 through the coolant outlet passage 106.

When the temperature of the coolant in the coolant jacket 12 is relatively low (viz., under warm-up condition of the engine), the switch valve 200 assumes the position as shown in FIG. 2 wherein the upper passage 104B is opened and the lower passage 104A is closed. Thus, in this condition, adequately warmed liquid coolant placed at the upper portion of the coolant jacket 12 is introduced into the heater core 102 thereby achieving satisfied heating of the passenger compartment P.

When, thereafter, the temperature of the liquid coolant in the coolant jacket 12 comes to such a high degree that boiling bulbes are vigorously produced in the coolant jacket 12B of the cylinder head 20, the switch valve 200 switches to assume the other condition wherein the upper coolant passage 104B is closed and the lower coolant passage 104A is opened. Thus, in this condition, the liquid coolant in the coolant jacket 12A of the cylinder block 18 is introduced into the heater core 102. That is, in this condition, the coolant with less bubles is supplied to the heater core 102 thereby keeping sufficient heating of the passenger compartment P.

Since, in the disclosed embodiment, the coolant outlet passage 106 is opened to the coolant jacket 12B of the cylinder head 20, the coolant thus somewhat cooled by the heater core 102 is effectively used for cooling the highly heated portions of the engine (such as portions near the combustion chambers). However, if desired, the outlet passage may be connected to the coolant jacket 12A of the cylinder block 18.

What is claimed is:

1. In a motor vehicle powered by a combustion engine cooled by a boiling liquid cooling system which includes a coolant jacket defined in the engine proper and containing therein a liquid coolant to a certain level to cover highly heated portions of the engine, a condenser for condensing the gaseous coolant introduced thereinto from the coolant jacket and recirculating means for recirculating the coolant thus liquefied by the condenser back into the coolant jacket, a passenger room heating system comprising:

a heat exchanger through which a liquid flows for achieving heat exchange between the liquid and air in the passenger room;

verticallty spaced first and second outlet ports formed in the engine proper to connect the coolant jacket separately, the second outlet port being positioned higher than the first outlet port when the engine proper is properly mounted in the vehicle;

a first conduit extending from a junction portion of the first and second outlet ports of said coolant jacket to a coolant inlet port of said heat exchanger;

a second conduit extending from a coolant outlet of said heat exchanger to said coolant jacket;

pumping means for enforcedly recirculating the coolant through the first conduit, the heat exchanger, the second conduit and the coolant jacket in this order; and switch means associated with the first and second outlet ports, the switch means functioning to open the second outlet port and close the first outlet port when the temperature of the coolant is lower than a predetermined degree and to close the second outlet port and open the first outlet port when the temperature of the coolant is higher than the predetermined degree.

2. A passenger room heating system as claimed in claim 1, in which said second outlet port is formed in a cylinder head of the engine, and in which the first outlet port is formed in a cylinder block of the engine.

3. A passenger room heating system as claimed in claim 2, in which said second conduit extends to a coolant inlet port formed in said cylinder head.

4. A passenger room heating system as claimed in claim 3, in which said coolant inlet port of the cylinder head is positioned in the vicinity of the combustion chambers of the engine.

5. A passenger room heating system as claimed in claim 4, in which said switch means comprises:

a thermatically operable valve body which is movable between a first position wherein said second outlet port is opened and said first outlet port is closed and a second position wherein said second outlet port is closed and said first outlet port is opened; and biasing means for biasing the valve body to assume said first position.

6. A passenger room heating system as claimed in claim 4, in which said switch means comprises:

a housing having therein mutually connected first, second and third bores which are respectively connected to said first outlet port, said second outlet port and said first conduit;

a valve body movable between a first position wherein said second bore is opened and said first bore is closed and a second position wherein said second bore is closed and said first bore is opened;

a wax sealingly contained in said valve body; and moving means for moving said valve body between said first and second positions when the wax therein contracts and expands selectively.

7. A passenger room heating system as claimed in claim 6, further comprising biasing means for biasing said valve body to assume said first position.

8. A passenger room heating system as claimed in claim 7, in which said moving means comprises:

a generally conical elastic sleeve coaxially disposed in said valve body with an interposal of said wax therebetween; and a piston rod having one end axially slidably disposed in said elastic sleeve and the other end fixed to a wall portion of said first bore, said the other end of said piston rod being tapered so as to match with the interior shape of the elastic sleeve.

9. A passenger room heating system as claimed in claim 6, in which said first and second bores are respectively formed with valve seat portions to which said valve body is contactable selectively when said valve body assumes said first and second positions selectively.

* * * * *